US007336832B2

(12) United States Patent
Kondo et al.

(10) Patent No.: US 7,336,832 B2
(45) Date of Patent: Feb. 26, 2008

(54) PROCESSOR AND PROCESSING METHOD FOR AN IMAGE SIGNAL, IMAGE DISPLAY APPARATUS, GENERATION APPARATUS AND GENERATION METHOD FOR COEFFICIENT DATA USED THEREIN, PROGRAM FOR EXECUTING EACH OF THESE METHODS, AND COMPUTER-READABLE MEDIUM RECORDING THE PROGRAM

(75) Inventors: Tetsujiro Kondo, Tokyo (JP); Tsutomu Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 864 days.

(21) Appl. No.: 10/622,659

(22) Filed: Jul. 18, 2003

(65) Prior Publication Data
US 2004/0120586 A1 Jun. 24, 2004

(30) Foreign Application Priority Data
Jul. 19, 2002 (JP) ............................... 2002-210997

(51) Int. Cl.
*G06K 9/00* (2006.01)
*G06K 9/36* (2006.01)
*G06K 9/40* (2006.01)
*H04N 7/18* (2006.01)
*H04N 7/12* (2006.01)

(52) U.S. Cl. ...................... 382/232; 382/103; 382/268; 382/275; 348/155; 348/208.13; 348/411.1; 375/240.16

(58) Field of Classification Search ................ 382/103, 382/180, 232–253, 268–269, 274–275; 348/143, 348/154–155, 208.13–208.14, 401.1–431.1; 375/240.16–240.17
See application file for complete search history.

(56) References Cited

U.S. PATENT DOCUMENTS
5,398,078 A * 3/1995 Masuda et al. ............. 348/699

(Continued)

FOREIGN PATENT DOCUMENTS
JP 8-18961 1/1996

(Continued)

OTHER PUBLICATIONS

Santoshi Kondo, "A method for removing blocking effects in MPEG-2 video by applying a block classification technique using stream information." IEEE transactions on consumer electronics. vol. 46, No. 3, Aug. 2000.*

*Primary Examiner*—Bhavesh M Mehta
*Assistant Examiner*—Manav Seth
(74) *Attorney, Agent, or Firm*—Frommer Lawrence & Haug LLP; William S. Frommer

(57) ABSTRACT

A class sorting section obtains a class code CL indicating a class to which pixel data y of a target position in an image signal Vb belongs using motion compensation vector information mi stored in a buffer memory in pair with pixel data of an image signal Va corresponding to the pixel data y. An estimated prediction calculation circuit obtains the pixel data y based on an estimation equation, using pixel data xi of a prediction tap and coefficient data Wi read from a coefficient memory. The coefficient data Wi has been obtained beforehand by a learning executed by use of a student signal which corresponds to the image signal Va and contains the same encoded noise as of the image signal Va, and a teacher signal which corresponds to the image signal Vb and contains no encoded signal.

8 Claims, 8 Drawing Sheets

U.S. PATENT DOCUMENTS

| | | | | |
|---|---|---|---|---|
| 5,768,429 | A * | 6/1998 | Jabbi et al. | 382/233 |
| 5,771,079 | A * | 6/1998 | Kim | 348/699 |
| 5,920,352 | A * | 7/1999 | Inoue | 382/232 |
| 6,061,400 | A * | 5/2000 | Pearlstein et al. | 375/240 |
| 6,075,899 | A * | 6/2000 | Yoshioka et al. | 382/233 |
| 6,081,622 | A * | 6/2000 | Carr et al. | 382/236 |
| 6,122,400 | A * | 9/2000 | Reitmeier | 382/166 |
| 6,249,549 | B1 * | 6/2001 | Kim | 375/240.21 |
| 6,295,376 | B1 * | 9/2001 | Nakaya | 382/236 |
| 6,408,101 | B1 * | 6/2002 | Krishnamurthy et al. | 382/240 |
| 6,408,101 | B1 * | 6/2002 | Krishnamurthy et al. | 382/240 |
| 6,430,317 | B1 * | 8/2002 | Krishnamurthy et al. | 382/236 |
| 6,452,971 | B1 * | 9/2002 | Iwasaki et al. | 375/240.12 |
| 6,483,928 | B1 * | 11/2002 | Bagni et al. | 382/107 |
| 6,560,371 | B1 * | 5/2003 | Song et al. | 382/240 |

FOREIGN PATENT DOCUMENTS

| | | |
|---|---|---|
| JP | 9-331526 | 12/1997 |
| JP | 2001-285882 | 10/2001 |

* cited by examiner

PROCESSOR AND PROCESSING METHOD FOR AN IMAGE SIGNAL, IMAGE DISPLAY APPARATUS, GENERATION APPARATUS AND GENERATION METHOD FOR COEFFICIENT DATA USED THEREIN, PROGRAM FOR EXECUTING EACH OF THESE METHODS, AND COMPUTER-READABLE MEDIUM RECORDING THE PROGRAM

BACKGROUND OF THE INVENTION

1. Field of the Invention

The present invention relates to a processor and processing method for an image signal, an image display apparatus, a generation apparatus and generation method for coefficient data used therein, a program for executing each of these methods and a computer-readable medium which records the program.

2. Description of Related Art

As a system for compression-encoding an image signal, there is an encoding system by means of moving picture experts group 2 (MPEG2) using discrete cosine transform (DCT) operation.

The DCT operation executes discrete cosine transform onto pixels within a block, and re-quantizes the coefficient data obtained as a result of the discrete cosine transform, and then further executes variable-length encoding onto the re-quantized coefficient data. In many cases, an entropy encoding such as Huffman encoding is used as the variable-length encoding. The image data is subject to orthogonal transform, thereby dividing it into a multitude of items of frequency data ranging from low frequency to high frequency.

When the divided frequency data is re-quantized, since low-frequency data has high importance taking into consideration of the visual characteristics of human beings, such low-frequency data is quantized in details. Contrarily, since high-frequency data has low importance taking into consideration the visual characteristics of human beings, such high-frequency data is roughly quantized. In this manner, high image quality is maintained and compression is realized with high efficiency.

Decoding by use of a conventional DCT operation converts quantized data for each frequency component into a typical value of its code, and executes inverse DCT (IDCT) operation for these components so as to obtain reproduced data. At the time of transformation into the typical value, a quantized step width at the time of encoding is used.

In addition, the encoding system by means of MPEG2 executes motion-compensated predictive encoding.

As described above, the encoding method by means of MPEG by use of DCT operation executes encoding taking into consideration the visual characteristics of human beings. In this manner, high quality is maintained and compression is realized with high efficiency.

However, since the encoding which executes DCT operation is a processing performed in the unit of blocks, there may occur noises in a form of block, that is, block noises (block distortion) as the compression rate increases. In addition, at a portion having a sudden change in brightness such as an edge, a mosquito noise resulted from roughly quantizing high frequency components occurs.

Such an encoding noise (encoding distortion) may occur not only in the encoding system by means of MPEG2, but also in other encoding systems.

The encoding system by means of MPEG 2 executes motion-compensated predictive encoding. As is already known, the encoded data of MPEG2 is expressed in a hierarchy structure. The hierarchy structure consists of a sequence layer, a group of picture (GOP) layer, a picture layer, a slice layer, a macro-block layer, and a block layer, starting from the high-order layer in this order.

The group of picture (GOP) layer starts from a GOP header, and normally consists of 10 to 15 pictures. The front picture is always an intra-picture (I-picture). The encoding structure of MPEG2 includes, in addition to the I-picture, a predictive-picture (P-picture) and a bidirectionally predictive-picture (B-picture).

The I-picture is an image obtained as a result of in-frame/in-field encoding, and is encoded independently from other frames/fields. The P-picture is an image obtained as a result of intra-frame/intra-field encoding based on a forward prediction from the I-picture and P-picture which are past in terms of time. The B-picture is an image obtained as a result of intra-frame/intra-field encoding based on a bidirectional prediction.

The units of the predictive encoding of MPEG2 are classified into two kinds: a frame picture unit and a field picture unit. When the frame picture unit is selected, the frame produced from an interlaced image is used as a picture unit for motion-compensated predictive encoding. When the field picture unit is selected, two most-recently encoded fields are used as a picture unit for motion-compensated predictive encoding.

The motion-compensated prediction of frame picture can be executed by use of any one of three prediction modes, that is, 1) a frame motion-compensated prediction, 2) a field motion-compensated prediction, and 3) dual-prime prediction. The motion-compensated prediction of field picture can be executed by use of any one of three prediction modes, that is, 1) field motion-compensated prediction, 2) dual-prime prediction, and 3) 16×8 motion-compensated prediction.

The motion-compensated predictive encoding subtracts each pixel data of a reference block which has been motion-compensated based on the motion vector from each pixel data constituting the input image block, and executes DCT operation onto the residual data remaining after the subtraction. In this case, the motion vector has an accuracy of ½ pixel.

For this reason, when the motion vector has a component of ½ pixel, pixels with integer accuracy are averaged to obtain pixel with an accuracy of ½ integer, and in turn to obtain a reference block. Therefore, when the motion vector has a component of ½ pixel, each pixel data in the reference block has a decreased number of high frequency components. The residual data includes information added thereto for compensating the decreased number of high frequency components. Contrary to this, when the motion vector has no component of ½ pixel, the residual data includes no information added thereto for compensating the decreased number of high frequency components.

An objective of the present invention is to satisfactorily reduce an encoding noise (encoding distortion) of an image signal obtained as a result of decoding a motion-compensated predictive encoded-digital image signal.

SUMMARY OF THE INVENTION

According to the present invention, an image signal processing apparatus converts a first image signal including multiple items of pixel data to a second image signal including multiple items of pixel data. The first image signal is generated by decoding a motion-compensated predictive encoded-digital image signal. The image signal processing apparatus comprises a class detection device for detecting a class to which pixel data of a target position in the second image signal belongs, based on at least motion-compensated predictive information which has been used at the time of obtaining the first image signal corresponding to the target position in the second image signal.

The motion-compensated predictive information includes motion compensation vector with an accuracy of ½ pixel. The class detection device detects a class differing depending on whether or not the motion compensation vector has a ½ pixel component.

As other motion-compensated predictive information, when the motion-compensated predictive encoding is MPEG2 encoding, information with a MPEG2 encoding structure (I-picture, P-picture, or B-picture), information of unit for predictive encoding (frame structure and field structure), motion-compensated predictive information on frame motion-compensated prediction, field motion compensation prediction, and the like are conceivable.

The image signal processing apparatus also comprises pixel data generation device for generating pixel data of the target position in the second image signal in correspondence with the class detected in the class detection device.

For example, the pixel data generation device includes coefficient data generator for generating coefficient data used in an estimation equation. The coefficient data corresponds to the class detected in the class detection device. The pixel data generation device includes data selector for selecting multiple items of pixel data located in the vicinity of the target position in the second image signal, based on the first image signal. The pixel data generation device includes calculator for calculating and obtaining the pixel data of the target position in the second image signal based on the estimation equation, by use of the coefficient data generated in the coefficient data generator and the multiple items of pixel data selected by the data selector.

Thus, the pixel data of the target position in the second image signal is generated in correspondence with the detected class in the manner as described above. For example, coefficient data corresponding to the class is generated and it is used in the estimation equation. Further, the multiple items of pixel data located in the vicinity of the target position in the second image signal is selected, based on the first image signal. Then, the pixel data of the target position in the second image signal is calculated based on the estimation equation, by use of the coefficient data and the multiple items of pixel data.

As described above, a class to which the pixel data of the target position in the second image signal belongs is detected, based on at least the motion-compensated predictive information which has been used at the time of obtaining the pixel data of the first image signal (input image signal) corresponding to the target position in the second image signal (output image signal). Then, pixel data of the target position in the output image signal is generated in correspondence with the detected class. This allows an encoded noise of the image signal obtained by decoding the motion-compensated predictive encoded-digital image signal to be satisfactorily reduced.

According to the present invention, an image signal processing method for converting a first image signal including multiple items of pixel data into a second image signal including multiple items of pixel data is provided. The first image signal is generated by decoding motion-compensated predictive encoded-digital image signal.

The method includes the steps of: detecting a class to which pixel data of a target position in the second image signal belongs, based on at least motion-compensated predictive information which has been used at the time of obtaining the pixel data of the first image signal corresponding to the target position in the second image signal; and generating pixel data of the target position in the second image signal in correspondence with the detected class.

Further, according to the present invention, a program is used for allowing a computer to execute the image signal processing method. Further, according to the present invention, a computer-readable medium records the above-described program.

According to the present invention, an image display apparatus includes image signal input device for inputting a first image signal including multiple items of pixel data. The first image signal is generated by decoding a motion-compensated predictive encoded-digital image signal. The image display apparatus also includes an image signal processing device for converting the first image signal which has been input into the image signal input device into a second image signal including multiple items of pixel data so as to output the resultant second image signal. The image display apparatus also includes image display device for displaying an image produced by the second image signal output by the image signal processing device onto an image display element. This image signal processing device has the same structure as of the image signal processing apparatus described above.

According to the present invention, an apparatus for generating coefficient data of an estimation equation to be used at the time of converting a first image signal including multiple items of pixel data into a second image signal including multiple items of pixel data is provided. The first image signal is generated by decoding a motion-compensated predictive encoded-digital image signal. The apparatus includes a decoder for decoding digital signal obtained as a result of encoding a teacher signal corresponding to the second signal so as to obtain a student signal corresponding to the first image signal. The apparatus also includes a class detector for detecting a class to which pixel data of a target position in the teacher signal belongs, based on at least the motion-compensated predictive information which has been used at the time of obtaining the pixel data of the student signal corresponding to the target position in the teacher signal. The apparatus further includes a data selector for selecting multiple items of pixel data located in the vicinity of the target position in the teacher signal, based on the student signal output from the decoder. Additionally, the apparatus includes a calculator for performing a calculation using the class detected in the class detector, the multiple items of pixel data selected by the data selector, and the pixel data of the target position in the teacher signal and obtaining the coefficient data for each class.

Further, according to the present invention, a method for generating coefficient data of an estimation equation to be used at the time of converting a first image signal including multiple items of pixel data into a second image signal including multiple items of pixel data is provided. The first image signal is generated by decoding a motion-compensated predictive encoded-digital image signal.

The method comprises: a first step for decoding digital signal obtained as a result of encoding a teacher signal corresponding to the second image signal so as to obtain a student signal corresponding to the first image signal; a second step for detecting a class to which pixel data of a target position in the teacher signal belongs, based on at least the motion-compensated predictive information which has been used at the time of obtaining the pixel data of the student signal corresponding to the target position in the teacher signal; a third step for selecting multiple items of pixel data located in the vicinity of the target position in the teacher signal, based on the student signal obtained in the first step; and a fourth step for obtaining the coefficient data for each class, by use of the class detected in the second step, the multiple items of pixel data selected in the third step, and the pixel data of the target position in the teacher signal.

Further, according to the present invention, a program is used for allowing a computer to execute the coefficient data generation method mentioned above. Further, according to the present invention, a computer-readable medium records the above-described program.

In the present invention, the first pixel signal including multiple items of pixel data is generated by decoding the motion-compensated predictive encoded-digital image signal. In the present invention, coefficient data of an estimation equation to be used at the time of converting the first image signal into the second image signal including multiple items of pixel data is generated.

The digital image signal which has been obtained by encoding the teacher signal corresponding to the second image signal is further decoded so as to generate the student signal corresponding to the first image signal. A class to which pixel data of the target position in the teacher signal is detected, based on at least the motion-compensated predictive information which has been used at the time of obtaining the pixel data of the student signal corresponding to the target position in the teacher signal.

Further, the multiple items of pixel data located in the vicinity of the target position in the teacher signal is selected based on the student signal. Then, coefficient data is obtained for each class, by use of the class to which the pixel data of the target position in the teacher signal belongs, the selected multiple items of pixel data, and the pixel data of the target position in the teacher signal.

In the manner as described above, the coefficient data of the estimation equation to be used at the time of converting the first image signal into the second image signal is generated. At the time of converting the first image signal into the second image signal, the pixel data of the target position in the second image signal is calculated based on the estimation equation, by selectively using the coefficient data corresponding to the class to which the pixel data of the target position in the second image signal belongs.

As a result, when the first image signal is converted into the second image signal by use of the estimation equation, it is possible to satisfactorily reduce the encoding noise of the image signal obtained by decoding the motion-compensated predictive encoded-digital image signal.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

DETAILED DESCRIPTION OF THE PREFERRED EMBODIMENTS

Figure 1:
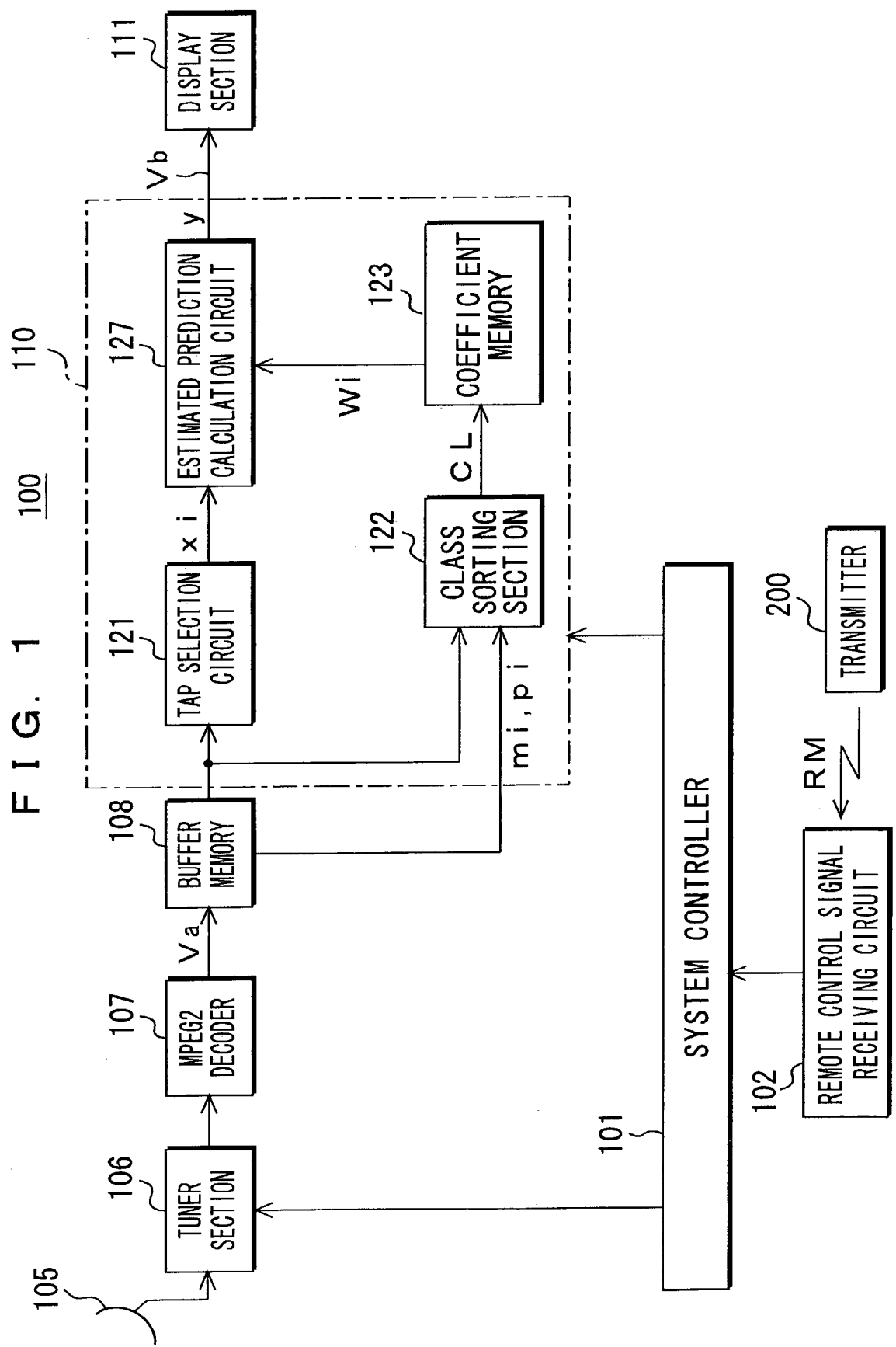
FIG. 1 is a block diagram showing a constitution of a digital-broadcasting receiver as an embodiment according to the present invention.

Hereinafter, embodiments of the present invention will be described with reference to drawings. FIG. 1 shows a constitution of a digital broadcasting receiver 100 as an embodiment according to the present invention.

The digital broadcasting receiver 100 comprises a system controller 101 that includes a microcomputer and controls operations of the entire system, and a remote control signal receiving circuit 102 for receiving a remote control signal. The remote control signal receiving circuit 102 is connected to the system controller 101, receives a remote control signal RM from a remote control transmitter 200 in response to a manipulation by a user, and supplies a manipulation signal corresponding to the signal RM to the system controller 101.

The digital broadcasting receiver 100 includes a receiving antenna 105, and a tuner section 106. The tuner section 106 is supplied with a broadcasting signal (an RF modulation signal) captured by the antenna 105, and executes selection of stations, demodulation, and error correction and the like so as to obtain a MPEG2 stream as an encoded image signal in relation to a specified program.

The digital broadcasting receiver 100 further includes a MPEG2 decoder 107 for decoding the MPEG2 stream received from the tuner section 106 so as to obtain an image signal Va, and a buffer memory 108 for temporality storing the image signal Va output from the MPEG2 decoder 107.

In this embodiment, the MPEG2 decoder 107 outputs each pixel data constituting the image signal Va, motion compensation vector information mi, which has been used at the time of obtaining the pixel data, and pixel position mode information pi indicating a pixel position where the pixel data is included in any of the 8×8 pixels in the DCT block. The information mi and the information pi are output in pair with each pixel data. The buffer memory 108 also stores these information mi, pi in pair with each pixel data.

Figure 2:
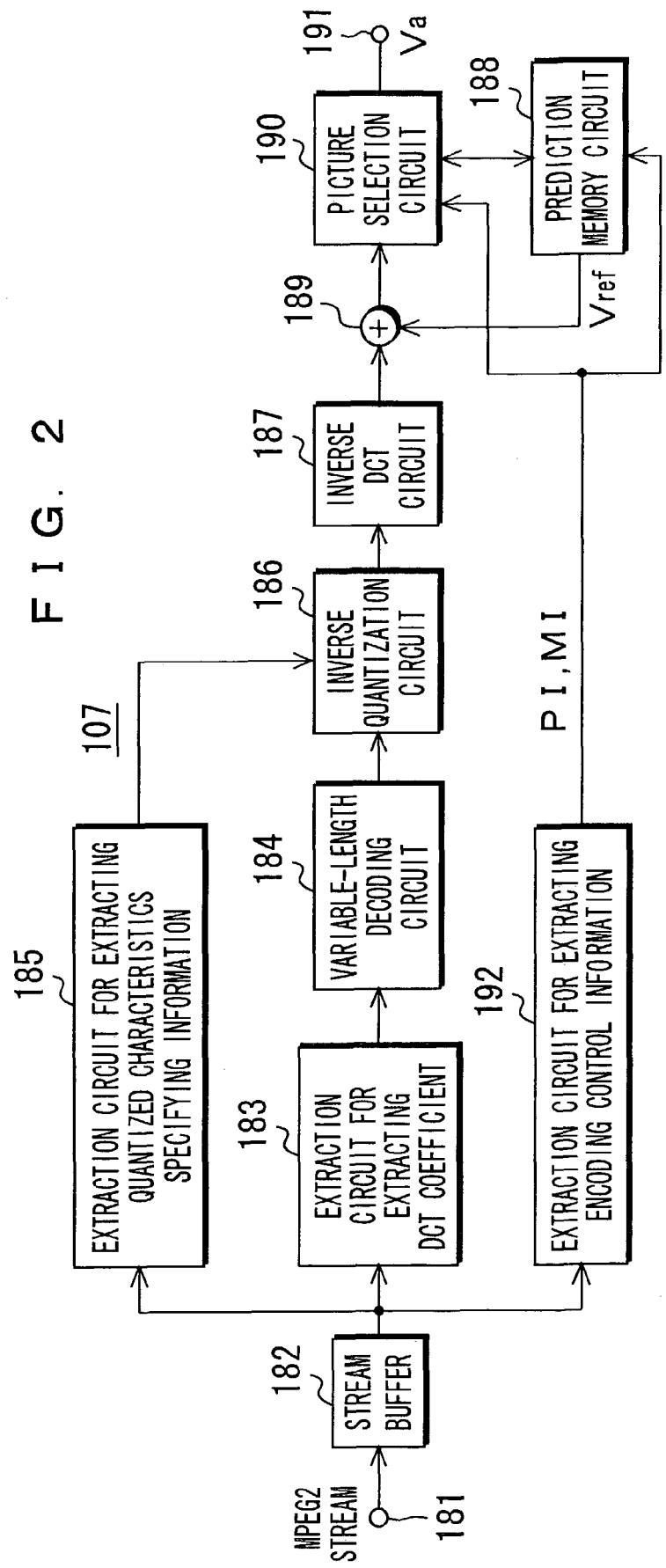
FIG. 2 is a block diagram showing a constitution of a MPEG2 decoder.

FIG. 2 shows a constitution of the MPEG2 decoder 107.

The decoder 107 includes an input terminal 181 for receiving the input MPEG2 stream, and a stream buffer 182 for temporarily storing the MPEG2 stream received from the input terminal 181.

The decoder 107 further includes an extraction circuit 183 and a variable-length decoding circuit 184. The extraction circuit 183 extracts a discrete cosine transform (DCT) coefficient as a frequency coefficient from the MPEG2 stream stored in the stream buffer 182. The variable-length decoding circuit 184 executes a variable-length decoding onto a DCT coefficient that has illustratively been Huffman-encoded and has been extracted in the extraction circuit 183.

The decoder 107 also includes an extraction circuit 185, an inverse quantization circuit 186, and an inverse DCT circuit 187. The extraction circuit 185 extracts quantized characteristics specifying information from the MPEG 2 stream stored in the stream buffer 182. The inverse quantization circuit 186 executes inverse quantization onto the quantized DCT coefficient received from the variable-length decoding circuit 184, based on the quantized characteristics specifying information extracted in the extraction circuit 185. The inverse DCT circuit 187 executes an inverse DCT operation onto the DCT coefficient received from the inverse quantization circuit 186.

The decoder 107 also includes a prediction memory circuit 188. The prediction memory circuit 188 stores image signals of an intra-picture (I-picture) and a predictive-picture (P-picture) into its memory (not shown). Further, when the inverse DCT circuit 187 outputs an image signal of a P-picture or a bidirectionally predictive-picture (B-picture) using the image signals of the I-picture and the P-picture stored in the unillustrated memory, the prediction memory circuit 188 generates and outputs a reference image signal Vref corresponding to the P-picture or the B-picture.

In addition, the decoder 107 also includes an addition circuit 189. When the inverse DCT circuit 187 outputs an image signal of the P-picture or the B-picture, the addition circuit 189 adds the reference image signal Vref generated in the prediction memory circuit 188 to this image signal. When the inverse DCT circuit 187 outputs an image signal of the I-picture, the prediction memory circuit 188 supplies no reference image signal Vref to the addition circuit 189. In this case, therefore, the addition circuit 189 outputs an image signal of the I-picture received from the inverse DCT circuit 187 as it is.

The decoder 107 also includes a picture selection circuit 190 and an output terminal 191. The picture selection circuit 190 supplies the prediction memory circuit 188 with image signals of the I-picture and the P-picture received from the addition circuit 189 to allow its memory to store these image signals. At the same time, the picture selection circuit 190 sorts the image signal of each picture received from the addition circuit 189 in a correct order and outputs the resultant image signals. The imager signal Va is output from the picture selection circuit 190 through the output terminal 191.

The decoder 107 also includes an extraction circuit 192 for extracting encoding control information, that is, picture information PI and motion compensation vector information MI from the MPEG2 stream stored in the stream buffer 182. The motion compensation vector information MI extracted in the extraction circuit 192 is supplied to the prediction memory circuit 188. The prediction memory circuit 188 then executes motion compensation at the time of generating the reference image signal Vref using the motion compensation vector information MI. The picture information PI extracted in the extraction circuit 192 is supplied to the prediction memory circuit 188 and the picture selection circuit 190. The prediction memory circuit 188 and the picture selection circuit 190 respectively identify the picture based on the picture information PI.

When the picture selection circuit 190 outputs the image signal Va, it also outputs, in addition to each pixel data constituting this image signal Va, the motion compensation vector information mi and the pixel position mode information pi. The motion compensation vector information mi has been used at the time of obtaining the pixel data. The pixel position mode information pi indicates a pixel position where the pixel data is included in any of 8×8 pixels in the DCT block. The motion compensation vector information mi and the pixel position mode information pi respectively are output in pair with each pixel data.

Operations of the MPEG2 decoder 107 shown in FIG. 2 will be described.

The MPEG2 stream stored in the stream buffer 182 is supplied to the extraction circuit 183 where a DCT coefficient as a frequency coefficient is extracted. The variable-length encoded DCT coefficient is then supplied to the variable-length decoding circuit 184 where it is decoded. Then, the variable-length decoding circuit 184 supplies the quantized DCT coefficient to the inverse quantization circuit 186 where the quantized DCT coefficient is inverse-quantized.

The inverse DCT circuit 187 executes an inverse DCT operation onto the DCT coefficient received from the inverse quantization circuit 186 so as to obtain an image signal of each picture. The image signal of each picture is supplied to the picture selection circuit 190 via the addition circuit 189. In this case, the addition circuit 189 adds the reference image signal Vref received from the prediction memory circuit 188 to the image signals of the P-picture and B-picture. The picture selection circuit 190 sorts image signals of the respective pictures in a correct order and the resultant image signals are output through the output terminal 191.

Returning to FIG. 1, the digital broadcasting receiver 100 also comprises an image signal processing section 110 and a display section 111. The image signal processing section 110 converts the image signal Va stored in the buffer memory 108 into an image signal Vb having a reduced amount of noises as a result of encoding such as block noise (block distortion) and mosquito noise. The display section 111 displays an image produced by the image signal Vb output from the image signal processing section 110. The display section 111 is constituted by a display such as a cathode-ray tube (CRT) display, a liquid crystal display (LCD) and the like.

Operations of the digital broadcasting receiver 100 will be described.

The MPEG2 stream output from the tuner section 106 is supplied to the MPEG2 decoder 107 where the MPEG2 stream is decoded. Then, the image signal Va output from the decoder 107 is supplied to the buffer memory 108 where the image signal Va is temporarily stored.

The image signal Va stored in the buffer memory 108 in the manner as described above is supplied to the image signal processing section 110 where it is converted into an image signal Vb having a reduced amount of encoding noises (encoding distortion). In the image signal processing section 110, pixel data constituting the image signal Vb is obtained from pixel data constituting the image signal Va.

The image signal Vb output from the image signal processing section 110 is supplied to the display section 111. The display section 111 displays an image produced by the image signal Vb on its display screen.

Next, the image signal processing section 110 will be described more in detail.

The image signal processing section 110 includes a tap selection circuit 121 as data selection means. The tap selection circuit 121 selectively takes out multiple items of pixel data each located in the vicinity of a target position in the image signal Vb from the image signal Va stored in the buffer memory 108. Namely, the tap selection circuit 121 is used for selectively taking out multiple items of pixel data for the predictive tap to be used for the prediction. For example, the tap selection circuit 121 takes out multiple items of pixel data which include pixel data of the image signal Va corresponding to the pixel data of the target position in the image signal Vb. The multiple items of pixel data respectively correspond to a DCT block to be a unit for DCT operation. In this case, when the DCT block consists of 8×8 pixels, 64 items of pixel data is taken out.

The image signal processing section 110 also includes a class sorting section 122 as class detection means for detecting a class to which the pixel data y of the target position in the image signal Vb belongs.

The class sorting section 122 generates the class code CL indicating a class to which the pixel data y of the target position in the image signal Vb belongs, by use of the multiple items of pixel data located in the vicinity of the target position in the image signal Vb among the multiple items of pixel data constituting the image signal Va stored in the buffer memory 108, the motion compensation vector information mi, and the pixel position mode information pi. The buffer memory 108 stores the information mi and pi in pair with the pixel data of the image signal Va corresponding to the pixel data of the target position in the image signal Vb.

Figure 3:
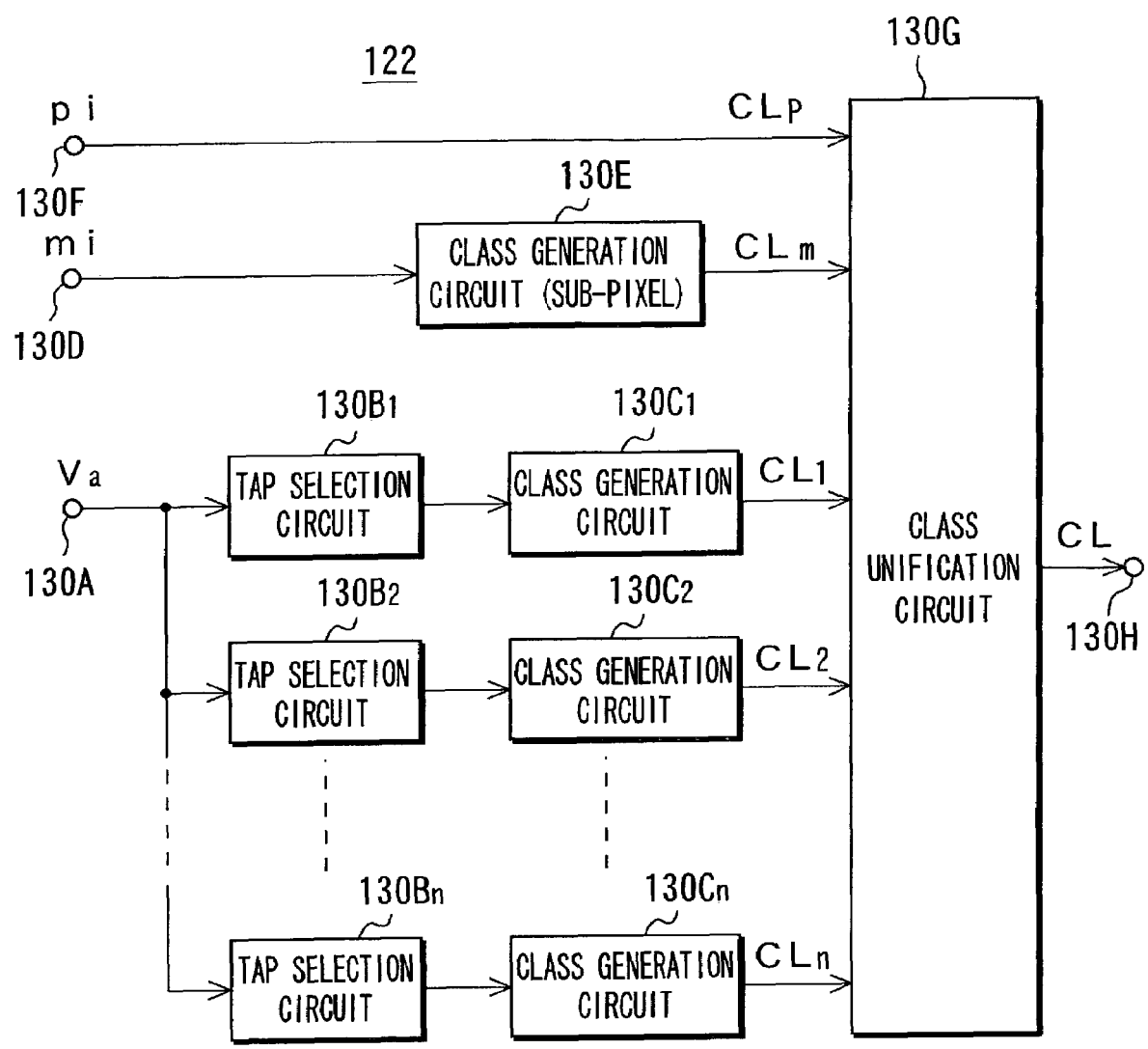
FIG. 3 is a block diagram showing a class sorting section.

FIG. 3 shows a constitution of the class sorting section 122.

The class sorting section 122 includes an input terminal 130A for inputting the image signal Va, tap selection circuits $130B_1$ to $130B_n$, and class generation circuits $130C_1$ to $130C_n$. The tap selection circuits $130B_1$ to $130B_n$ selectively take out multiple items of pixel data for class taps each used for detecting n kinds of classes to which the pixel data of the target position in the image signal Vb belongs, based on the image signal Va input into the input terminal 130A. The class generation circuits $130C_1$ to $130C_n$ generates class codes $CL_1$ to $CL_n$ indicating n kinds of classes using the pixel data taken out in the tap selection circuits $130B_1$ to $130B_n$ respectively.

In this embodiment, the class codes $CL_1$ to $CL_6$ indicating six kinds of classes are generated. The six kinds of classes are as follows: a space wave class, a time variation class, an AC variation class, a flat class, a line correlation class, and a block edge class. Each of the classes will be briefly described.

1) The space wave class will be described. It is assumed that the tap selection circuit $130B_1$ and the class generation circuit $130C_1$ constitute a detection system for this space wave class.

Figure 4:
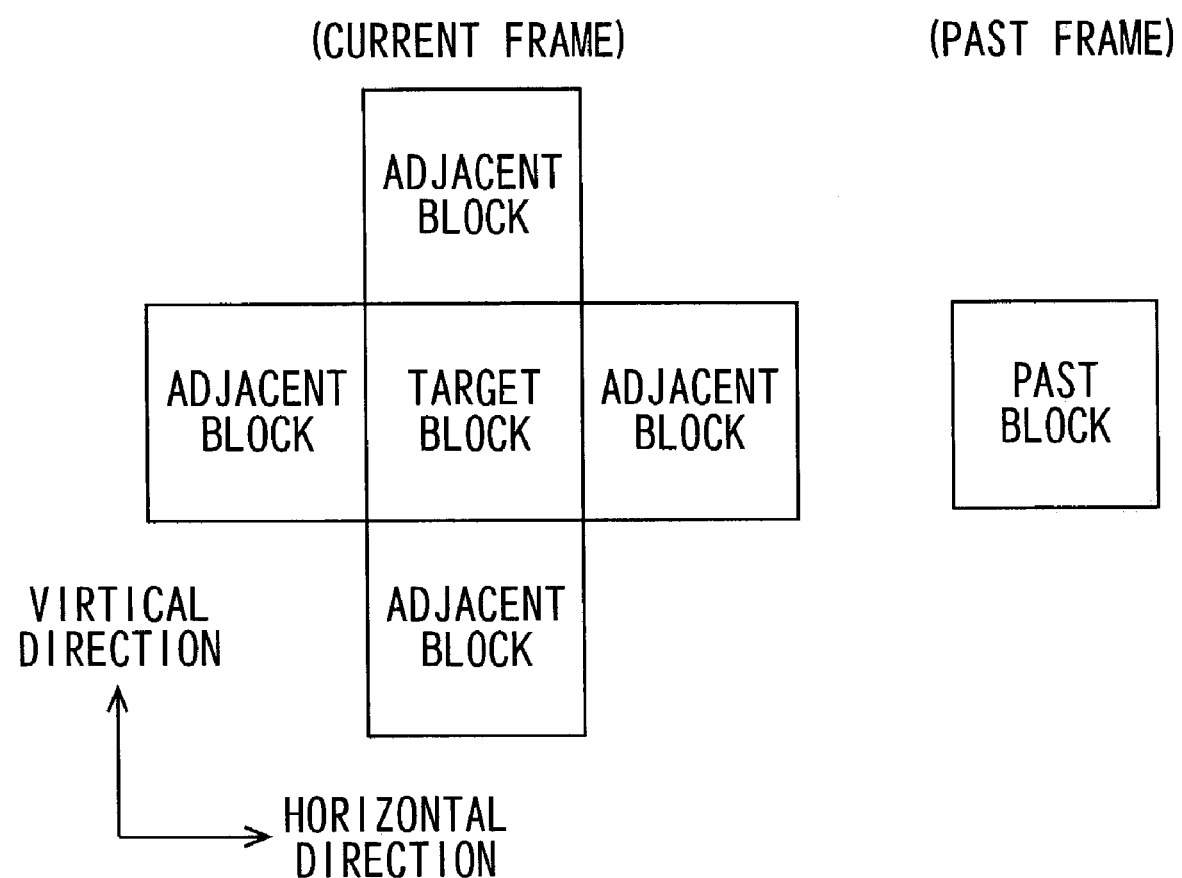
FIG. 4 is a diagram showing a block for tap selection.

The tap selection circuit $130B_1$ takes out the pixel data in a block corresponding to the pixel data y of the target position in the image signal Vb (i.e., the target block shown in FIG. 4) from the current frame of the image signal Va. The class generation circuit $130C_1$ divides 8×8 items of pixel data into four regions, and calculates a pixel average value of each divided region so as to obtain 2×2 items of high-order pixel data. Then, the class generation circuit $130C_1$ executes one-bit adaptive dynamic range coding (ADRC) and the like onto each of the 2×2 items of pixel data so as to generate 4-bit class code $CL_1$ indicating a space wave class.

According to the ADRC, a maximum value and a minimum value of the multiple items of pixel data in the class tap are obtained. A dynamic range, which is a difference between the maximum value and the minimum value, is then obtained. Each pixel value is re-quantized in correspondence with the dynamic range. In the case of 1-bit ADRC, the pixel value is converted into 1 bit depending on whether the pixel value is larger or smaller than the average value of the multiple items of pixel values of the class tap. The ADRC is a processing for reducing the number of classes indicating the level distribution of the pixel values to a relatively small number. Therefore, it is also possible to, instead of the ADRC, employ encoding for compressing the bit number of pixel value such as vector quantization (VQ).

2) The time variation class will be described. It is assumed that the tap selection circuit $130B_2$ and the class generation circuit $130C_2$ constitute a detection system of the time variation class.

The tap selection circuit $130B_2$ takes out pixel data in a block corresponding to the pixel data y of the target position in the image signal Vb (i.e., the target block shown in FIG. 4) from the current frame of the image signal Va. The tap selection circuit $130B_2$ also takes out pixel data in a block (i.e., the past block shown in FIG. 4) corresponding to the target block from the past frame preceding the current frame by one frame in the image signal Va.

The class generation circuit $130C_2$ executes subtraction for each corresponding pixel between 8×8 items of pixel data in the target block and 8×8 items of pixel data in the past block so as to obtain a difference value between these 8×8 items of pixel data Then, the class generation circuit $130C_2$ obtains a sum of squares of the difference values between these 8×8 items of pixel data. The class generation circuit $130C_2$ then determines whether or not the sum of squares is a threshold value so as to generate a 2-bit class code $CL_2$ indicating a time variation class.

3) The AC variation class will be described. It is assumed that the tap selection circuit $130B_3$ and the class generation circuit $130C_3$ constitute a detection system for the AC variation class.

The tap selection circuit $130B_3$ takes out pixel data of a block corresponding to the pixel data y of the target position in the image signal Vb (i.e., the target block shown in FIG. 4) from the current frame of the image signal Va. The tap selection circuit $130B_3$ also takes out pixel data of a block (i.e., the past block shown in FIG. 4) corresponding to the target block from the past frame preceding the current frame by one frame in the image signal Va.

The class generation circuit $130C_3$ executes the DCT operation onto the 8×8 items of pixel data in the target block and the 8×8 items of pixel data in the past block respectively so as to obtain a DCT coefficient (i.e. a frequency coefficient). The class generation circuit $130C_3$ then obtains the number $m_1$ of the bottom position where the coefficient is present at each bottom position in the AC portion, and the number $m_2$ of the bottom position where the sign is reversed and either one of the coefficients is 0. Then, the class generation circuit $130C_3$ determines whether or not $m_1/m_2$ is a threshold value so as to generate a 2-bit class code $CL_3$ indicating the AC variation class. In the block where the time variation is small, it is possible to execute a class sorting in correspondence with a mosquito distortion by use of this AC variation class.

4) The flat class will be described. It is assumed that the tap selection circuit $130B_4$ and the class generation circuit $130C_4$ constitute a detection system for the flat class.

The tap selection circuit $130B_4$ takes out pixel data in a block corresponding to the pixel data y of the target position in the image signal Vb (i.e., the target block shown in FIG. 4) from the current frame of the image signal Va. The class generation circuit $130C_4$ detects a maximum value and a minimum value of 8×8 items of pixel data in the target block. The class generation circuit $130C_4$ then determines whether or not the dynamic range, which is a difference between the maximum value and the minimum value, is a threshold value so as to generate a 1-bit class code $CL_4$ indicating a flat class.

5) The line correlation class will be described. It is assumed that the tap selection circuit $130B_5$ and the class generation circuit $130C_5$ constitute a detection system for this line correlation class.

The tap selection circuit $130B_5$ takes out pixel data in a block corresponding to the pixel data y of the target position in the image signal Vb (i.e. the target block shown in FIG. 4) from the current frame of the image signal Va.

The class generation circuit $130C_5$ executes subtraction for each corresponding pixel between the first line and the second line, the third line and the fourth line, the fifth line and the six line, and the seventh line and the eighth line of 8×8 items of image data in the target block so as to obtain 8×4 items of difference values. Then, the class generation circuit $130C_5$ obtains a sum of squares of the 8×4 items of difference values, and then determines whether or not the sum of squares is a threshold value so as to generate a 1-bit class code $CL_5$ indicating a line correlation class. This line correlation class indicates whether the in-frame correlation is high as is the case of a static image, or the motion is rapid and the in-field correlation is higher than the in-frame correlation.

6) The block edge class will be described. It is assumed that the tap selection circuit $B_6$ and the class generation circuit $130C_6$ constitute a detection system for the block edge class.

The tap selection circuit $130B_6$ takes out pixel data of a block corresponding to the pixel data y of the target position in the image signal Vb (i.e. the target block shown in FIG. 4) from the current frame of the image signal Va. The tap selection circuit $130B_6$ also takes out pixel data of the blocks horizontally or vertically adjacent the target block (i.e. the adjacent blocks shown in FIG. 4) from the current frame.

The class generation circuit $130C_6$ executes subtraction for each corresponding pixel between each 8 items of pixel data located along four sides of the target block and the pixel data of the adjacent blocks, which is adjacent to the target block, so as to obtain 4×8 items of difference values. Then, the class generation circuit $130C_6$ obtains a sum of squares of difference values as to the respective 8 items of pixel data, and then determines whether or not the respective 4 items of the sums of squares respectively corresponding to the four sides of the target block are threshold values so as to generate a 4-bit class code $CL_6$ indicating the block edge class.

The class sorting section 122 includes an input terminal 130D for inputting the motion compensation vector information mi, and a class generation circuit 130E for generating a class code $CL_m$ indicating a sub-pixel class to which the pixel data y of the target position in the image signal Vb belongs to, based on the motion compensation vector information mi input into the input terminal 130D.

The class generation circuit 130E determines whether or not the motion compensation vector has been used based on the motion compensation vector information mi. The class generation circuit 130E determines whether or not the motion compensation vector has a ½ pixel component when the motion compensation vector has been used. The class generation circuit 130E then sorts the motion compensation vector into either one of the three classes so as to generate a two-bit class code $CL_m$ indicating a sub-pixel class.

The class sorting section 122 includes an input terminal 130F for inputting pixel position mode information pi. The pixel position mode information pi is directly used as a class code $CL_p$ indicating a pixel position mode class. For example, when the DCT block consists of 8×8 items of pixel data, this class code $CL_p$ is a 6-bit code.

The class sorting section 122 also includes a class unification circuit 130G for unifying the class codes $CL_1$ to $CL_n$ and $CL_m$ respectively generated in the class generation circuits $130C_1$ to $130C_n$ and 130E, and the class code $CL_p$ into one class code CL, and an output terminal 130H for outputting the class code CL.

In this embodiment, the class unification circuit 130G unifies the class codes $CL_1$ to $CL_6$ and $CL_m$ respectively generated in the class generation circuits $130C_1$ to $130C_6$ and 130E, and the class code $CL_p$ into one class code CL.

If the class codes $CL_1$ to $CL_6$, $CL_m$, and $CL_p$ are simply unified into one class code, the resultant class code CL shows 16 classes (space wave class)×4 classes (time variation class)×4 classes (AC variation class)×2 classes (flat class)×2 classed (line correlation class)×16 classes (block edge class)×3 classes (sub-pixel class)×64 classes (pixel position mode class)=3,145,728 classes.

In this embodiment, however, the AC variation class is unified with the time variation class as a tree structure. Specifically, when the time variation is small, there is a strong likelihood that this is a static portion. Therefore, a time variation class sorting is first executed, and when the time variation is small, the AC variation class sorting is executed as a tree structure. In this manner, the number of classes becomes 7 (=4+4−1) after the time variation class and the AC variation class have been unified.

Further, in this embodiment, the line correlation class is unified with the flat class as a tree structure. Specifically, flat class sorting is first executed, and if not flat, the line correlation class sorting is executed as a tree structure. In this manner, the number of classes becomes 3 (=2+2−1) after the flat class and the line correlation class have been unified.

As a result of executing the class unification by means of a tree structure as described above, the class code CL indicates 16 classes (space wave class)×7 classes (time variation class and the AC variation class)×16 classes (block edge class)×3 classes (flat class and line correlation class)×3 classes (sub-pixel class)×64 classes (pixel position mode class)=1032192 classes, so that the number of classes can be significantly reduced.

Returning to FIG. 1, the image signal processing section 110 includes a coefficient memory 123. This coefficient memory 123 stores coefficient data Wi (where i=1 to n, and n represents the number of predictive taps) as to each class. The coefficient data Wi is used in an estimation equation to be used in an estimated prediction calculation circuit 127 described later. This coefficient data Wi is information to be used for converting the image signal Va into the image signal Vb. The coefficient memory 123 receives the class code CL from the class sorting section 122 described above as address information. The coefficient memory 123 reads the coefficient data Wi of an estimation equation corresponding to the class code CL to the estimated prediction calculation circuit 127. A method for generating the coefficient data Wi will be described later.

The image signal processing section 110 includes the estimated prediction calculation circuit 127 for calculating image data y of the target position in the image signal Vb to be produced, by means of the following estimation equation (1), from the pixel data xi of the predictive tap selectively taken out in the tap selection circuit 121 and $$y = \sum_{i=1}^{n} W_i \cdot x_i \tag{1}$$

the coefficient data Wi read out of the coefficient memory 123.

Operations of the image signal processing section 110 will be described.

The class sorting section 122 generates the class code CL indicating a class to which the pixel data y of the target position in the image signal Vb belongs, by use of the multiple items of pixel data located in the vicinity of the target position in the image signal Vb among multiple items of pixel data constituting the image signal Va stored in the buffer memory 108, and the motion compensation vector information mi and the pixel position mode information pi stored in the buffer memory 108 in pair with the pixel data of the image signal Va corresponding to the pixel data of the target position in the image signal Vb.

Specifically, the class sorting section 122 generates class codes $CL_1$ to $CL_6$ respectively indicating the space wave class, the time variation class, the AC variation class, the flat class, the line correlation class, and the block edge class by use of the multiple items of pixel data located in the vicinity of the target position in the image signal Vb. The class sorting section 122 also generates a class code $CL_m$ indicating a sub-pixel class from the motion compensation vector information mi. The class sorting section 122 generates a class code $CL_p$ indicating a pixel position mode class from the pixel position mode information pi. Finally, the class sorting section 122 unifies these class codes $CL_1$ to $CL_6$, $CL_m$, and $CL_p$ into one class code CL.

The class code CL thus-generated in the class sorting section 122 is supplied to the coefficient memory 123 as read address information. In this manner, the coefficient data Wi corresponding to the class code CL is read out of the coefficient memory 123. The read coefficient data Wi is supplied to the estimated prediction calculation circuit 127.

Further, the tap selection circuit 121 selectively takes out multiple items of pixel data for the predictive tap located in the vicinity of the target position in the image signal Vb from the image signal Va stored in the buffer memory 108. In this case, the tap selection circuit 121 takes out multiple items of pixel data, which includes pixel data of the image signal Va corresponding to the pixel data of the target position in the image signal Vb and corresponds to the DCT block to be used as a unit for DCT operation.

The estimated prediction calculation circuit 127 obtains the pixel data y of the target position in the image signal Vb to be produced, based on the estimation equation (1) using the pixel data xi of the predictive tap and the coefficient data Wi read from the coefficient memory 123.

As described above, the image signal processing section 110 obtains the image signal Vb from the image signal Va using the coefficient data In this case, the coefficient data obtained from a learning by use of a student signal, which corresponds to the image signal Va and contains an encoded noise similar to that of the image signal Va, and a teacher signal, which corresponds to the image signal Vb and contains no encoded noise, is used as the coefficient data Wi. In this manner, the resultant image signal Vb has a significantly reduced amount of encoded noise as compared with the image signal Va.

The class sorting section 122 in the image signal processing section 110 generates a class code $CL_m$ indicating a sub-pixel class from the motion compensation vector information mi as the motion compensation information, and generates a class code CL including this class code $CL_m$ unified therewith.

Therefore, this class code CL shows different classes depending on the case where the motion compensation vector is not used for obtaining the pixel data of the image signal Va corresponding to the pixel data of the target position in the image signal Vb, the case where the motion compensation vector is used therefor but does not contain a ½ pixel component, and the case where the motion compensation vector is used and contains a ½ pixel component.

The motion compensation vector is used in the case where the image signal of P-picture or B-picture is decoded. On the other hand, the motion compensation vector is not used in the case where the image signal of I-picture is decoded. When the image signal of P-picture or B-picture is decoded by use of the motion compensation vector, the reference image signal Vref is motion-compensated by the motion compensation vector. Therefore, the state of the image signal Va is different depending on whether the motion compensation vector is used or not.

Further, as described above, when the motion compensation vector contains a ½ pixel component in the MPEG2 encoder, the pixels with integer accuracy are averaged so as to obtain a pixel with ½ integer accuracy and then to obtain a reference block. Therefore, when the motion compensation vector contains a ½ pixel component, each pixel data of the reference image signal Vref has a decreased amount of high frequency component. The residual data has information added thereto for compensating the decreased amount of high frequency component. Contrary to this, when the motion compensation vector contains no ½ pixel component, the residual data has no information for compensating the decreased amount of high frequency component. Therefore, the state of the image signal Va is different depending on whether the motion compensation vector contains a ½ pixel component or not.

The coefficient data Wi read out of the coefficient memory 123 based on the class code CL differs depending on whether the motion compensation vector is used or not, and further depending on whether the motion compensation vector contains a ½ pixel component or not. Then, the read coefficient data Wi is supplied to the estimated prediction calculation circuit 127.

Therefore, the image signal processing section 110 can accurately obtain the pixel data y of the target position in the image signal Vb depending on whether the motion compensation vector is used or not, and further depending on whether the motion compensation vector contains a ½ pixel component or not. As a result, it is possible to obtain an image signal Vb including a satisfactorily reduced amount of encoded noise as compared with the image signal Va.

Next, a method for generating coefficient data Wi stored in the coefficient memory 123 will be described. This coefficient data Wi is generated by a learning beforehand.

First, the learning method will be described. In the above-mentioned Equation (1), each coefficient data $W_1$, $W_2$, ..., Wn is undefined coefficient before the learning. The learning is executed in each class onto multiple items of signal data. When the number of the learning data is m, following Equation (2) is set in each class in accordance with Equation (1). In Equation (2), n denotes the number of predictive taps.

$$Y_k = W_1 \times X_{k1} + W_2 \times X_{k2} + \ldots + W_n \times X_{kn} \qquad (2)$$

(k=1,2, ..., m)

When m>n, the coefficient data $W_1$, $W_2$, ..., $W_n$ is not uniquely fixed. Therefore, en element $e_k$ of an error vector e is defined in following Equation (3) so as to obtain coefficient data which renders the value $e^2$ in Equation (4) minimum. Specifically, the coefficient data is uniquely determined by a least square method.

$$e_k = y_k - \{W_1 \times X_{k1} + W_2 \times X_{k2} + \ldots + W_n \times X_{kn}\} \qquad (3)$$

(k=1, 2, ..., m)

$$e^2 = \sum_{k=1}^{m} e_k^2 \quad (4)$$

In a practical calculation method for obtaining the coefficient data, which renders the value of $e_2$ of Equation (4) minimum, first, the value of $e_2$ is partially differentiated as shown in Equation (5) by the coefficient data Wi (i=1, 2, ..., n) so as to obtain the coefficient data Wi in such a manner that the partial differentiation value becomes 0 as to each value of i.

$$\frac{\partial e^2}{\partial Wi} = \sum_{k=1}^{m} 2\left(\frac{\partial ek}{\partial Wi}\right) e_k = \sum_{k=1}^{m} 2 x_{ki} \cdot e_k \quad (5)$$

A specific process for obtaining the coefficient data Wi from Equation (5) will be described. Defining Xji and Yi as indicated in Equations (6) and (7), Equation (5) can be expressed by the determinant of Equation (8).

$$X_{ji} = \sum_{p=1}^{m} x_{pi} \cdot x_{pj} \quad (6)$$

$$Y_i = \sum_{k=1}^{m} x_{ki} \cdot y_k \quad (7)$$

$$\begin{bmatrix} X_{11} & X_{12} & \cdots & X_{1n} \\ X_{21} & X_{22} & \cdots & X_{2n} \\ \cdots & \cdots & \cdots & \cdots \\ X_{n1} & X_{n2} & \cdots & X_{nn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_n \end{bmatrix} \quad (8)$$

Equation (8) is a generally so-called normal equation. The coefficient data Wi (i=1, 2, ..., n) can be obtained by solving this normal equation by means of a general solution such as a sweeping method (Gauss-Jordan deletion method).

Figure 5:
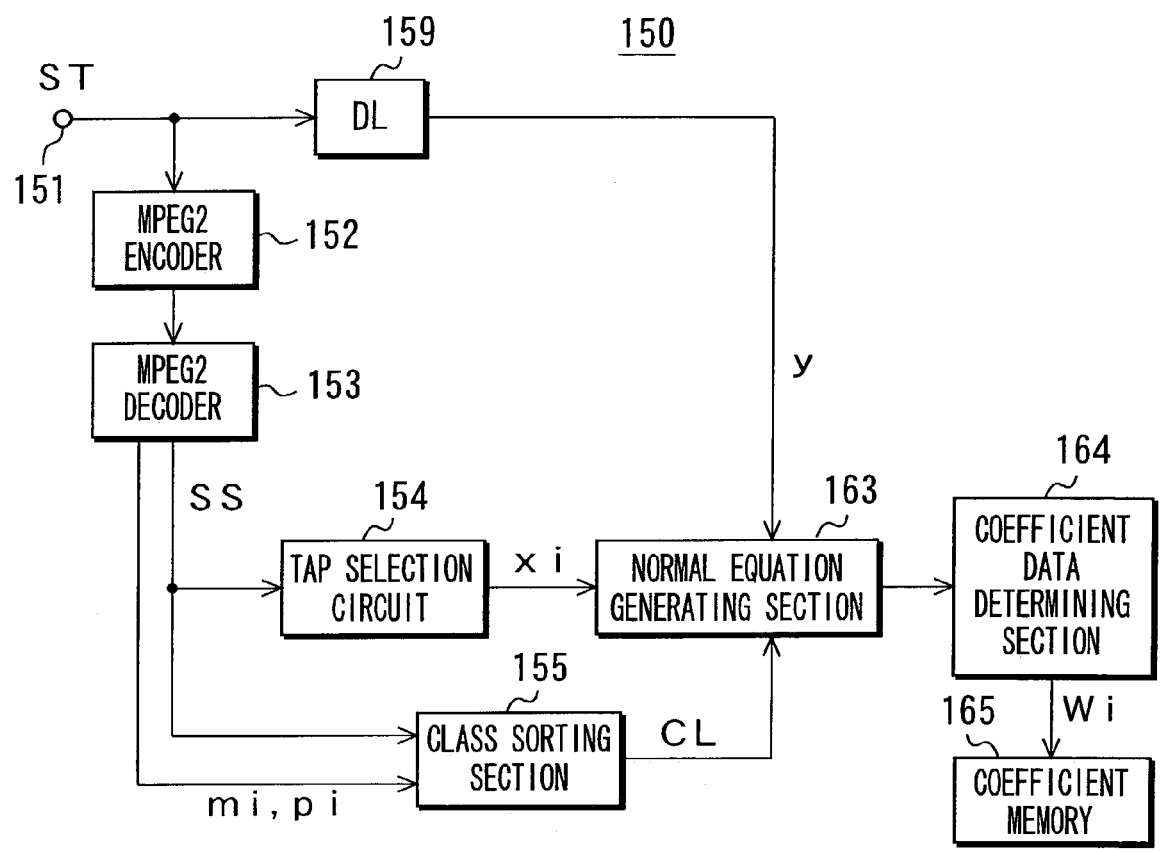
FIG. 5 is a block diagram showing a constitution of a coefficient data generation apparatus.

FIG. 5 shows a constitution of a coefficient data generation apparatus 150 for generating the coefficient data Wi to be stored in the coefficient memory 123 of the image signal processing section 110 shown in FIG. 1.

The coefficient data generation apparatus 150 includes an input terminal 151, a MPE2 encoder 152, and a MPEG2 decoder 153. The input terminal 151 receives a teacher signal ST corresponding to the image signal Vb. The MPE2 encoder 152 encodes the teacher signal ST to obtain a MPEG2 stream. The MPEG2 decoder decodes the MPEG2 stream to obtain a student signal SS corresponding to the image signal Va. Here, the MPEG2 decoder 153 corresponds to the MPEG2 decoder 107 and the buffer memory 108 in the digital broadcasting receiver 100 shown in FIG. 1.

The coefficient data generation apparatus 150 also includes a tap selection circuit 154 for selectively taking out multiple items of pixel data located in the vicinity of the target position in the teacher signal ST from the student signal SS received from the MPEG2 decoder 153 and outputting the resultant multiple items of pixel data. The tap selection circuit 154 has the same constitution as the tap selection circuit 121 of the image signal processing section 110 described above.

The coefficient data generation apparatus 150 also includes a class sorting section 155 as class detection means for detecting a class to which the pixel data y of the target position in the teacher signal Vb belongs.

The class sorting section 155 generates a class code CL indicating a class to which the pixel data y of the target position in the teacher signal ST belongs, by use of multiple items of pixel data located in the vicinity of the target position in the teacher signal ST among multiple items of pixel data constituting the student signal SS obtained from the MPEG2 decoder 153, and the motion compensation vector information mi and the pixel position mode information pi, which are obtained from the MPEG2 decoder 153 in pair with the pixel data of the student signal SS corresponding to the pixel data of the target position in the teacher signal ST. The class sorting section 155 has the same constitution as the class sorting section 122 of the image signal processing section 110 described above.

The coefficient data generation apparatus 150 includes a delay circuit 159 for time adjustment of the teacher signal ST supplied to the input terminal 151; and a normal equation generating section 163. The normal equation generating section 163 generates a normal equation (see the Equation (8) above) for obtaining coefficient data Wi (i=1 to n) for each class from the pixel data y of each target position obtained from the teacher signal ST that has been time-adjusted in the delay circuit 159, the pixel data xi of the prediction tap that is selectively taken out in the tap selection circuit 154 in correspondence with the pixel data y of each target position, and the class code CL generated in the class sorting section 155 in correspondence with the pixel data y of each target position.

In this case, one learning data is generated in combination with one item of pixel data y and n items of the pixel data xi of prediction taps corresponding to the one item of pixel data y. A large number of items of the learning data are generated for each class between the teacher signal ST and the student signal SS. In this manner, the normal equation generating section 163 generates a normal equation for obtaining coefficient data Wi (i=1 to n) for each class.

The coefficient data generation apparatus 150 also includes a coefficient data determining section 164 for receiving the data of the normal equation generated in the normal equation generating section 163 and solving the received normal equation to obtain coefficient data Wi for each class, and a coefficient memory 165 for storing thus-obtained coefficient data Wi for each class.

Next, operations of the coefficient data generation apparatus 150 shown in FIG. 5 will be described.

The input terminal 151 receives the teacher signal ST corresponding to the image signal Vb. The MPEG2 encoder 152 then encodes the teacher signal ST so as to generate the MPEG2 stream. The resultant MPEG2 stream is supplied to the MPEG2 decoder 153. The MPEG2 decoder 153 decodes the MPEG2 stream so as to generate the student signal SS corresponding to the image signal Va.

The class sorting section 155 generates the class code CL indicating a class to which the pixel data y of the target position in this teacher signal ST belongs, by use of multiple items of pixel data located in the vicinity of the target position in the teacher signal ST among multiple items of pixel data constituting the teacher signal SS obtained in the MPEG2 decoder 153, the motion compensation vector information mi and the pixel position mode information pi, which are obtained in the MPEG2 decoder 153 in pair of the pixel data of the student signal SS corresponding to the pixel data of the target position in the teacher signal ST.

Further, the tap selection circuit 154 selectively takes out multiple items of pixel data for the prediction tap located in the vicinity of the target position in the teacher signal ST from the student signal SS obtained in the MPEG2 decoder 153.

Then, the normal equation generating section 163 generates the normal equation (see the Equation (8) above) for obtaining coefficient data Wi (i=1 to n) for each class, by use of the pixel data y of each target position obtained from the teacher signal ST which has been time-adjusted in the delay circuit 159, the pixel data xi of the prediction tap selectively taken out in the tap selection circuit 154 respectively in correspondence with the pixel data y of each target position, and the class code CL generated in the class sorting section 155 respectively in correspondence with the pixel data y of each target position.

Then, the coefficient data determining section 164 solves the resultant equation so as to obtain coefficient data Wi for each class. The resultant coefficient data Wi is stored in the coefficient memory 165.

In this manner, in the coefficient data generation apparatus 150 shown in FIG. 5, it is possible to generate the coefficient data Wi for each class to be stored in the coefficient memory 123 of the image signal processing section 110 shown in FIG. 1.

Thus-obtained coefficient data Wi is obtained as a student signal SS as a result of encoding the teacher signal ST so as to generate a MPEG2 stream and then decoding the MPEG2 stream. Thus-obtained student signal SS contains an encoded noise as is the case of the image signal Va. Therefore, the image signal Vb obtained by use of this coefficient data Wi from the image signal Va in the image signal processing section 110 shown in FIG. 1 has a reduced amount of encoded noise as compared with the image signal Va.

Figure 6:
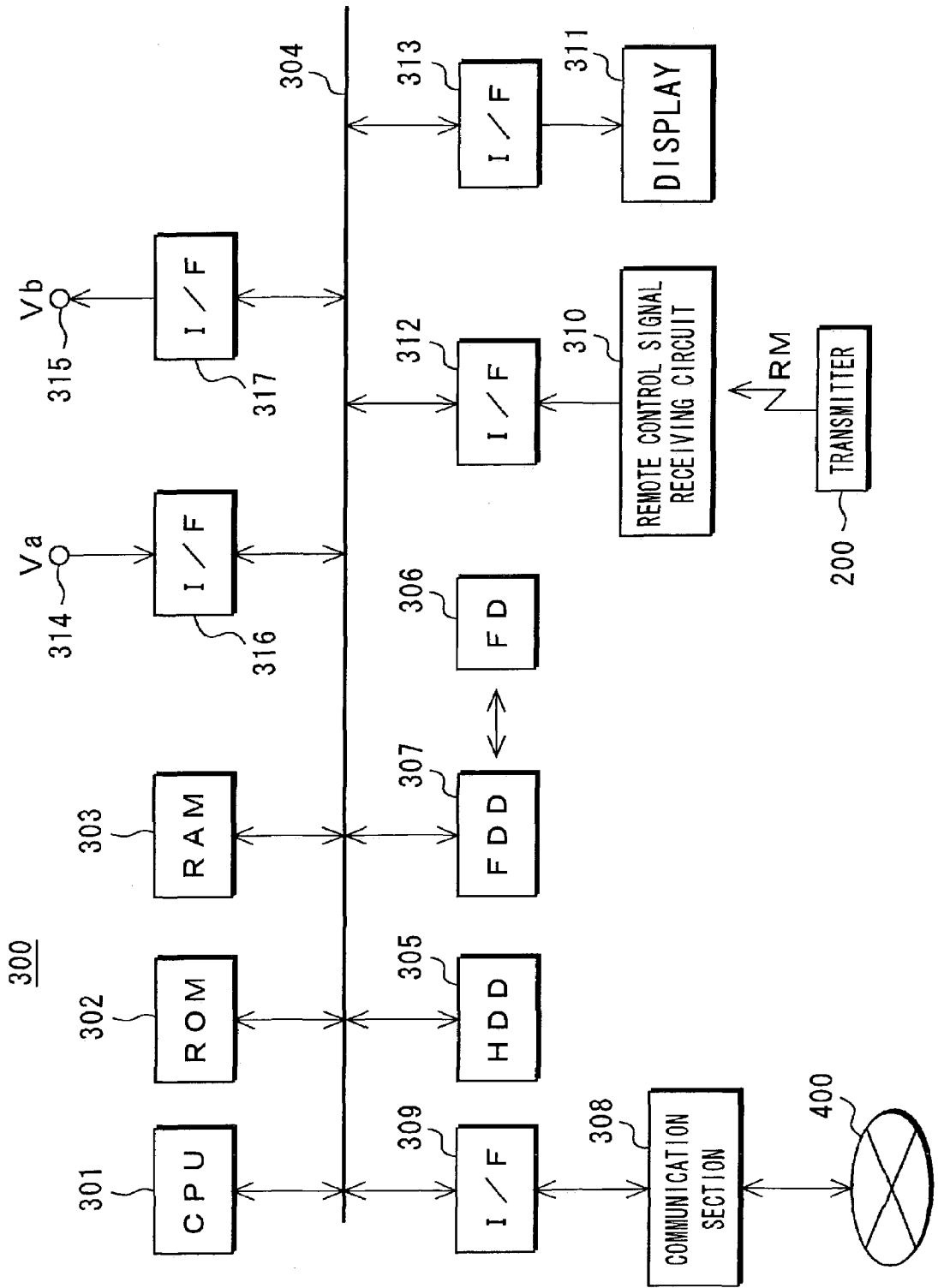
FIG. 6 is a block diagram showing an exemplary constitution of an image signal processor to be realized in software.

Alternatively, the processing executed in the image signal processing section 110 shown in FIG. 1 may be realized in software by an image signal processing apparatus 300 shown in FIG. 6, for example.

First, an image signal processing apparatus 300 shown in FIG. 6 will be described. The image signal processing apparatus 300 includes a CPU 301 for controlling operations of entire apparatus, a read only memory (ROM) 302 for storing a control program for the CPU 301, coefficient data and the like, and a random access memory (RAM) 303 constituting a working area for the CPU 301. The CPU 301, the ROM 302 and the RAM 303 are respectively connected to a bus 304.

The image signal processing apparatus 300 also includes a hard disc drive (HDD) 305 as an external storage apparatus, and a drive (FDD) 307 for driving a Floppy (Trade Name) disc 306. These drives 305 and 307 are respectively connected to the bus 304.

The image signal processing apparatus 300 also includes a communication section 308 for communicating with an communication network 400 such as the Internet and the like in a wired or wireless manner. The communication section 308 is connected to the bus 304 via an interface 309.

The image signal processing apparatus 300 also includes a user interface section. This user interface section includes a remote control signal receiving circuit 310 for receiving a remote control signal RM from a remote control transmitter 200, and a display 311 constituted by a liquid crystal display (LCD) and the like. The receiving circuit 310 is connected to the bus 304 via an interface 312, and similarly, the display 311 is connected to the bus 304 via an interface 313.

The image signal processing apparatus 300 also includes an input terminal 314 for inputting the image signal Va, and an output terminal 315 for outputting the image signal Vb.

The input terminal 314 is connected to the bus 304 via an interface 316, and similarly, the output terminal 315 is connected to the bus 304 via an interface 317.

Instead of storing the control program, the coefficient data and the like into the ROM 302 beforehand in the manner described above, they may be downloaded from the communication network 400 such as the Internet via the communication section 308 for example. They may be also stored in a hard disc or the RAM 303 for use. Alternatively, the control program, the coefficient data and the like may be provided in the form of Floppy (Trade Name) disc 306 storing them.

Further, instead of inputting the image signal Va to be processed from the input terminal 314, the image signal Va may be recorded in a hard disc beforehand, or may be downloaded beforehand from the communication network 400 such as the Internet via the communication section 308. Further, instead of or at the same time of outputting the processed image signal Vb through the output terminal 315, the processed image signal Vb may be supplied to the display 311 to make an image display. Alternatively, the processed image signal Vb may be also stored in a hard disc or may be sent out to the communication network 400 such as the Internet via the communication section 308.

Referring to the flowchart of FIG. 7, a procedure for obtaining an image signal Vb from an image signal Va in the image signal processing apparatus 300 shown in FIG. 6 will be described.

First, a processing is started in Step ST61. Then, in Step S62, an image signal Va by one frame or one field is input, for example, from the input terminal 314 to the apparatus. The RAM 303 temporarily stores the pixel data constituting the image signal Va thus input from the input terminal 314. If the image signal Va is recorded in the hard disc drive 305 within the apparatus beforehand, this drive 305 reads the image signal Va, and the RAM 303 then temporality stores the pixel data constituting thus-read image signal Va.

Then, in Step ST63, it is determined whether or not all the frames or all the fields of the image signal Va have been processed. Then, when the processing has been finished, the processing is ended in Step ST64. Contrarily, when the processing has not yet been finished, the procedure proceeds to Step ST65.

In Step ST65, the class code CL indicating a class to which the pixel data of the target position in the image signal Vb belongs, based on multiple items of pixel data located in the vicinity of the target position in the image signal Vb among the image signal Va, which has been input in Step ST62, and also based on, although not mentioned above, motion compensation vector information mi and pixel position mode information pi, which have been input in pair of the pixel data of the image signal Va corresponding to the pixel data of the target position in the image signal Vb.

Next, in Step ST66, multiple items of pixel data (pixel data for the prediction tap) located in the vicinity of the target position in the image signal Vb are obtained from the image signal Va input in Step ST62. Then, in Step ST67, it is determined whether or not the processing for obtaining the pixel data of the image signal Vb has been finished in all the area of the pixel data of the image signal Va by one frame or one field which has been input in Step ST62. When finished, the procedure returns to Step ST62 and the input of the image signal Va for the next one frame or one field is started. Contrarily, when not finished the procedure proceeds to Step ST68.

In Step ST68, the pixel data of the target position in the image signal Vb is generated based on the estimation equation, by use of the coefficient data Wi corresponding to the class code CL generated in Step ST65 and the pixel data for the prediction tap. Subsequently, the procedure returns to Step ST65 to start a processing for the next target position.

Figure 7:
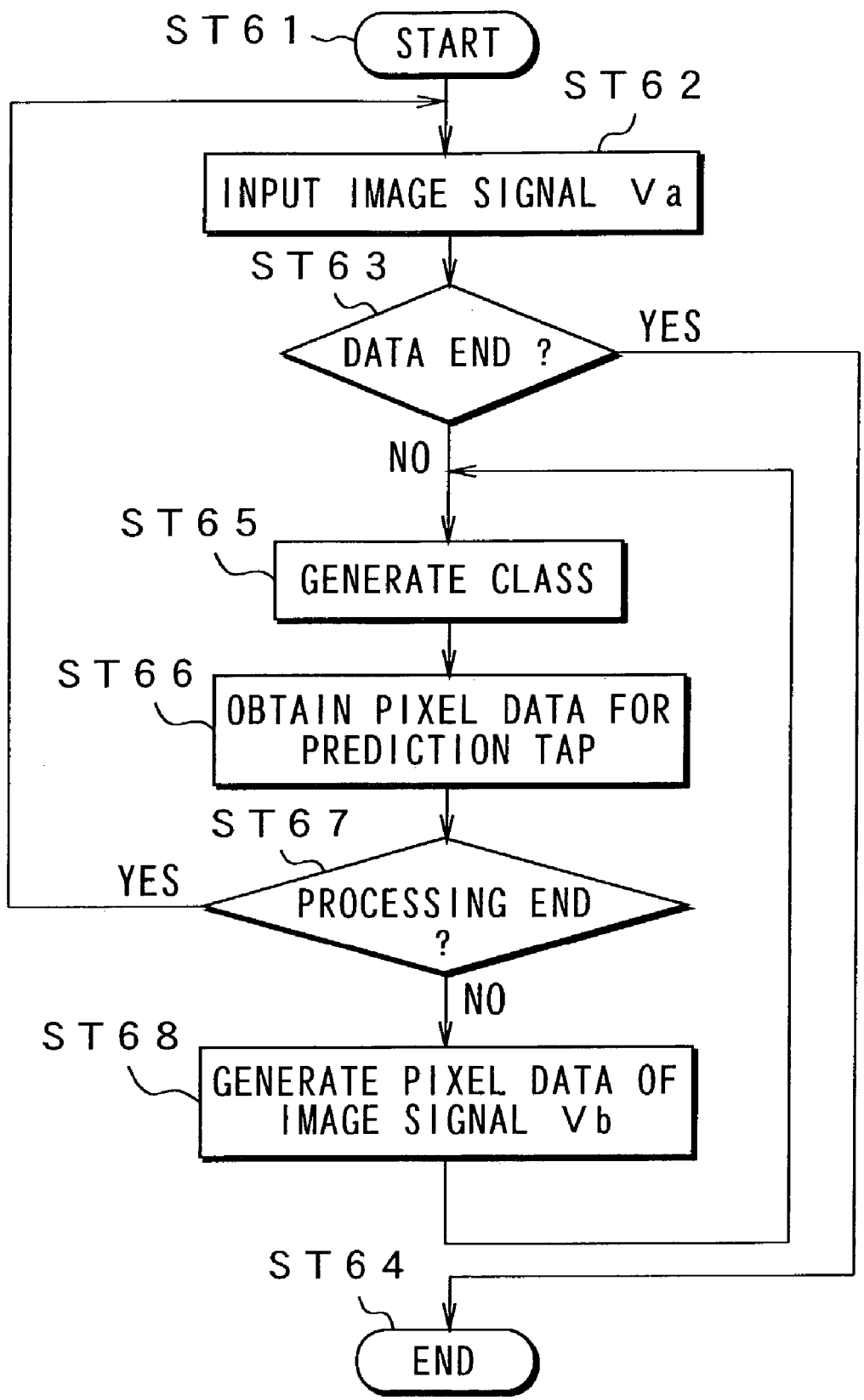
FIG. 7 is a flowchart showing an image signal processing.

As a result of the processing along the flowchart shown in FIG. 7 as described above, the pixel data of the input image signal Va is processed, thereby obtaining pixel data of the image signal Vb. As described above, thus-obtained image signal Vb is output through the output terminal 315 or is supplied to the display 311 to create an image thereon, or is supplied to the hard disc drive 305 so as to be recorded in the hard disc.

The processing in the coefficient data generation apparatus 150 shown in FIG. 5 may be realized in software, although the illustration of the processing apparatus is omitted.

Referring to the flowchart of FIG. 8 the procedure for generating coefficient data will be described.

First, a processing is started in Step ST81. Then, a teacher signal ST is input only by one frame or one field in Step ST82. Then, in Step ST83, it is determined whether or not all the frames or all the fields of the teacher signal has been processed. When not processed yet, in Step ST84, a student signal SS is generated from the teacher signal ST, which has been input in Step ST82.

Then, in Step ST85, a class code CL indicating a class to which pixel data of the target position in the teacher signal ST belongs is generated, based on multiple items of pixel data located in the vicinity of the target position in the teacher signal ST among the student signals SS generated in Step ST84, and also based on, although not mentioned above, the motion compensation vector information mi and the pixel position mode information pi, which have been obtained in correspondence with the pixel data of the student signal SS corresponding to the pixel data of the target position in the teacher signal ST.

Further, in Step ST86, multiple items of pixel data (pixel data for the prediction tap) located in the vicinity of the target position in the teacher signal ST are obtained from the student signal SS generated in Step ST84. Then, in Step ST87, it is determined whether or not the learning has been finished in all the area of the pixel data of the teacher signal ST by one frame or one field which has been input in Step ST82. When the learning has been finished, the procedure returns to Step ST82 and the input of the teacher signal ST for the next one frame or one field is started to repeat the same processing described above. Contrarily, when the learning has not been finished, the procedure proceeds to Step ST88.

In Step ST88, a normal equation (see the Equation (8) above) for obtaining coefficient data Wi for each class is generated, by use of the class code CL generated in Step ST85, multiple items of pixel data xi obtained in Step ST86, and the pixel data y of the target position in the teacher signal ST. Subsequently, the procedure returns to Step ST85 to start a processing for the next target position.

When the processing is finished in Step ST83 described above, in Step ST89, the normal equation generated in the Step ST88 described above is solved by means of a sweeping method and the like so as to calculate coefficient data of each class. Then, in Step ST90, the coefficient data of each class is stored in the memory. Subsequently, the processing is ended in Step ST91.

Figure 8:
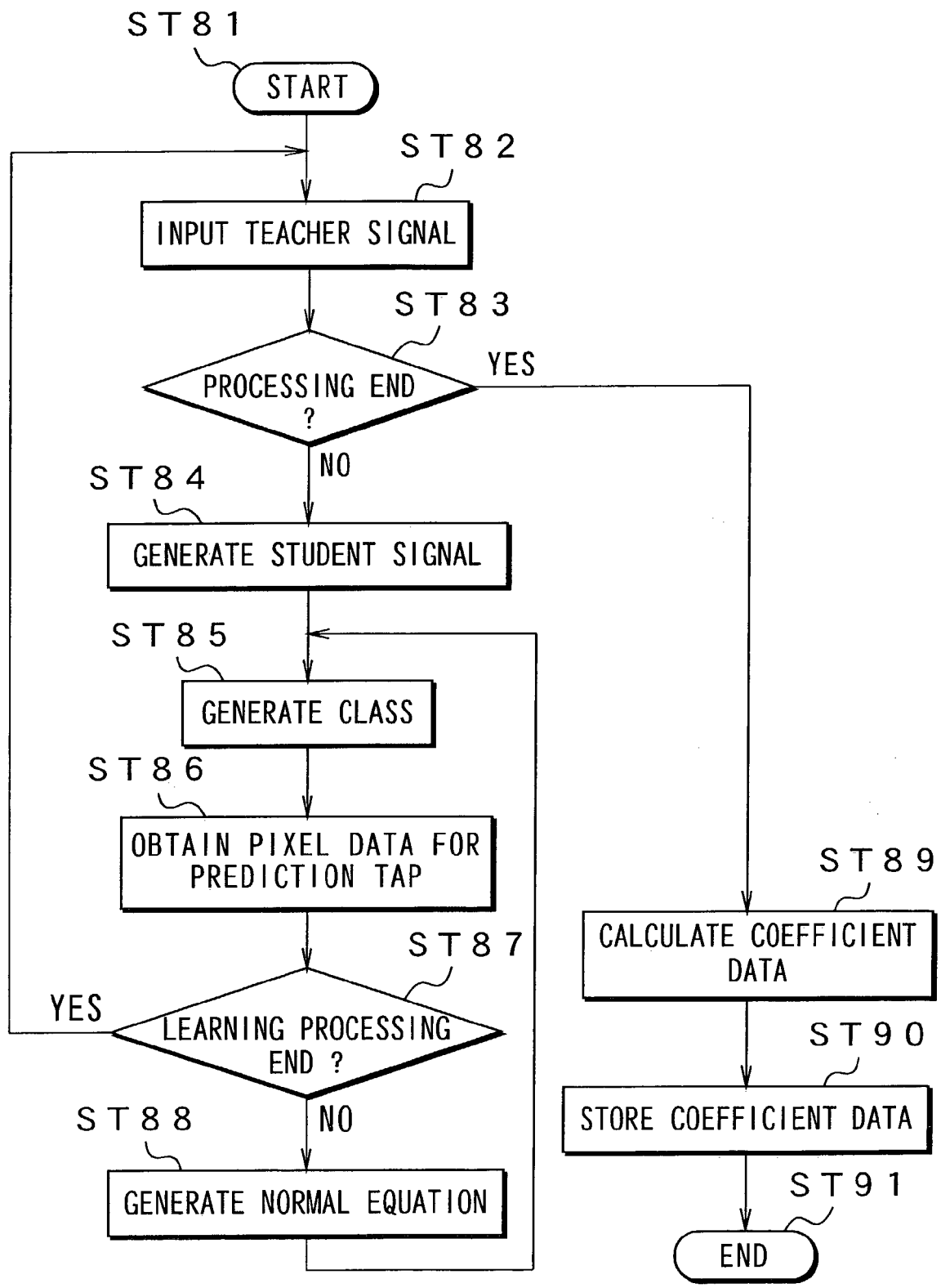
FIG. 8 is a flowchart showing a coefficient data generation processing.

As a result of the processing along the flowchart shown in FIG. 8 as described above, the coefficient data Wi of each class can be obtained in the same manner as of the coefficient data generation apparatus 150 shown in FIG. 5.

In the embodiment described above, the motion compensation vector information mi is used for class sorting operation. Alternatively, other kinds of motion compensation predictive information may be used. For example, when the motion compensation predictive encoding is MPEG2 encoding, it is possible to use information with a MPEG2 encoding structure (I-picture, P-picture, or B-picture), the unit of predictive encoding (frame structure, field structure), motion compensation predictive information (frame motion compensation prediction, field motion compensation prediction, and the like), or the like. In this alternative case as well, the encoded noise of the image signal can be satisfactorily reduced.

In the embodiment described above, the MPEG2 stream is handled. However, the present invention may also similarly be applicable to any other cases where a digital image signal obtained as a result of motion-compensated predictive encoding is handled.

According to the present invention, a class to which the pixel data of the target position in the output image signal belongs is detected, based on the motion-compensated predictive information which has been used at the time of obtaining the pixel data of the input image signal corresponding to the target position in at least the output image signal. Then, the pixel data of the target position in the output image signal is generated in correspondence with the detected class. In this manner, it is possible to satisfactorily reduce the encoded noise of the image signal obtained as a result of decoding the digital image signal which has been motion-compensated predictive encoded.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An image signal processing apparatus for processing a first image signal including multiple items of pixel data, said first image signal being generated by decoding a motion-compensated predictive encoded-digital image signal, to allow the first image signal to be converted to a second image signal including multiple items of pixel data, said apparatus comprising:

class detection means for detecting a class to which pixel data of a target position in said second image signal belongs, based on at least motion compensation vector information having sub-pixel accuracy which has been used at the time of obtaining the pixel data of said first image signal corresponding to the target position in said second image signal; and pixel data generation means for generating pixel data of the target position in said second image signal in correspondence with said class detected in said class detection means, wherein the class detection means detects a class difference based on whether the motion compensation vector has a sub-pixel component.

2. The image signal processing apparatus according to claim 1, wherein said pixel data generation means comprises:

coefficient data generation means for generating coefficient data used in an estimation equation, said coefficient data corresponding to the class detected in said class detection means;

data selection means for selecting multiple items of pixel data located in the vicinity of the target position in said second image signal, based on said first image signal; and calculation means for calculating and obtaining the pixel data of the target position in said second image signal based on said estimation equation, by use of the coefficient data generated in said coefficient data generation means and the multiple items of pixel data selected by said data selection means.

3. A image signal processing method for processing a first image signal including multiple items of pixel data, said first image signal being generated by decoding a motion-compensated predictive encoded-digital image signal, to allow the first image signal to be converted to a second image signal including multiple items of pixel data, said method comprising the steps of:

detecting a class to which pixel data of a target position in the second image signal belongs, based on at least motion compensation vector information with sub-pixel accuracy which has been used at the time of obtaining the pixel data of said first image signal corresponding to the target position in said second image signal;

generating pixel data of the target position in said second image signal in correspondence with said detected class; and detecting a class difference based on whether the motion compensation vector has a sub-pixel component.

4. A computer-readable medium for recording a program of an image signal processing method for processing a first image signal including multiple items of pixel data, said first image signal being generated by decoding a motion-compensated predictive encoded-digital image signal, to allow the first image signal to be converted to a second image signal including multiple items of pixel data, said method comprising the steps of:

detecting a class to which pixel data of a target position in the second image signal belongs, based on at least motion compensation vector information with sub-pixel accuracy which has been used at the time of obtaining the pixel data of said first image signal corresponding to the target position in said second image signal;

generating pixel data of the target position in said second image signal in correspondence with said detected class; and detecting a class difference based on whether the motion compensation vector has a sub-pixel component.

5. An image display apparatus comprising:

image signal input means for inputting a first image signal including multiple items of pixel data, said first image signal being generated by detecting a motion-compensated predictive encoded-digital image signal;

image signal processing means for processing said first image signal thus input by said input means to allow the first image signal to be converted to a second image signal including multiple items of pixel data, and outputting the resultant second image signal; and image display means for displaying an image produced by said second image signal output by the image signal processing means onto an image display element, wherein said image signal processing means comprises:

class detection means for detecting a class to which pixel data of a target position in said second image signal belongs, based on at least motion compensation vector information with sub-pixel accuracy which has been used at the time of obtaining the pixel data of said first image signal corresponding to the target position in said second image signal; and pixel data generation means for generating the pixel data of the target position in said second image signal in correspondence with the class detected in said class detection means, wherein the class detection means detects a class difference based on whether the motion compensation vector has a sub-pixel component detecting a class difference based on whether the motion compensation vector has a sub-pixel component.

6. An apparatus for generating coefficient data of an estimation equation to be used at the time of converting a first image signal including multiple items of pixel data, said first image signal being generated by decoding a motion-compensated predictive encoded-digital image signal, to a second image signal including multiple items of pixel data, said apparatus comprising:

decoding means for decoding digital image signal obtained as a result of encoding a teacher signal corresponding to said second image signal and obtaining a student signal corresponding to said first image signal;

class detection means for detecting a class to which pixel data of a target position in said teacher signal belongs, based on at least the motion compensation vector information with sub-pixel accuracy which has been used at the time of obtaining the pixel data of said student signal corresponding to the target position in said teacher signal;

data selection means for selecting multiple items of pixel data located in the vicinity of the target position in said teacher signal, based on the student signal output from said decoding means; and calculation means for performing a calculation using the class detected in said class detection means, the multiple items of pixel data selected by said data selection means, and the pixel data of the target position in said teacher signal, and obtaining the coefficient data for each class, wherein the class detection means detects a class difference based on whether the motion compensation vector has a sub-pixel component.

7. A method for generating coefficient data of an estimation equation to be used at the time of converting a first image signal including multiple items of pixel data, said first image signal being generated by decoding a motion-compensated predictive encoded-digital image signal to a second image signal including multiple items of pixel data, said method comprising:

a first step for decoding digital image signal obtained as a result of encoding a teacher signal corresponding to said second image signal and obtaining a student signal corresponding to said first image signal;

a second step for detecting a class to which pixel data of a target position in said teacher signal belongs, based on at least motion compensation vector information with sub-pixel accuracy which has been used at the time of obtaining the pixel data of said student signal corresponding to the target position in said teacher signal;

a third step for selecting multiple items of pixel data located in the vicinity of the target position in said teacher signal, based on the student signal obtained in said first step;

a fourth step for obtaining said coefficient data for said each class, by use of the class detected in said second step, the multiple items of pixel data selected in said third step, and the pixel data of the target position in said teacher signal; and a fifth step for detecting a class difference based on whether the motion compensation vector has a sub-pixel component.

8. A computer-readable medium recording a program of a method for generating coefficient data of an estimation equation to be used at the time of converting a first image signal including multiple items of pixel data, said first image signal being generated by decoding a motion-compensated predictive encoded-digital image signal, to a second image signal including multiple items of pixel data, said method comprising:

- a first step for decoding digital image signal obtained as a result of encoding a teacher signal corresponding to said second signal and obtaining a student signal corresponding to said first image signal;
- a second step for detecting a class to which pixel data of a target position in said teacher signal belongs, based on at least motion compensation vector information with sub-pixel accuracy which has been used at the time of obtaining the pixel data of said student signal corresponding to the target position in said teacher signal;
- a third step for selecting multiple items of pixel data located in the vicinity of the target position in said teacher signal, based on the student signal obtained in said first step;
- a fourth step for obtaining said coefficient data for said each class, by use of the class detected in said second step, the multiple items of pixel data selected in said third step, and the pixel data of the target position in said teacher signal; and
- a fifth step for detecting a class difference based on whether the motion compensation vector has a sub-pixel component.

* * * * *